(12) United States Patent
Kaltenbach et al.

(10) Patent No.: US 10,099,684 B2
(45) Date of Patent: Oct. 16, 2018

(54) METHOD FOR OPERATING A DRIVE UNIT FOR A HYBRID VEHICLE

(71) Applicant: ZF Friedrichshafen AG, Friedrichshafen (DE)

(72) Inventors: Johannes Kaltenbach, Friedrichshafen (DE); Uwe Griesmeier, Markdorf (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 752 days.

(21) Appl. No.: 14/443,197

(22) PCT Filed: Oct. 10, 2013

(86) PCT No.: PCT/EP2013/071164
§ 371 (c)(1),
(2) Date: Aug. 24, 2015

(87) PCT Pub. No.: WO2014/075852
PCT Pub. Date: May 22, 2014

(65) Prior Publication Data
US 2015/0375736 A1    Dec. 31, 2015

(30) Foreign Application Priority Data
Nov. 15, 2012 (DE) .................. 10 2012 220 829

(51) Int. Cl.
*B60W 20/40* (2016.01)
*B60K 6/365* (2007.10)
(Continued)

(52) U.S. Cl.
CPC ............ *B60W 20/40* (2013.01); *B60K 6/365* (2013.01); *B60K 6/387* (2013.01); *B60K 6/442* (2013.01);
(Continued)

(58) Field of Classification Search
CPC ...... B60W 20/00; B60W 20/40; B60W 10/02; B60W 10/06; B60W 10/08; B60W 10/113;
(Continued)

(56) References Cited

U.S. PATENT DOCUMENTS 6,645,105 B2 * 11/2003 Kima ..................... B60K 6/365
475/5
8,075,436 B2   12/2011 Bachmann
(Continued)

FOREIGN PATENT DOCUMENTS

| | | |
|---|---|---|
| DE | 10 2010 046766 | 3/2012 |
| DE | 10 2010 062827 | 6/2012 |

OTHER PUBLICATIONS

German Patent Office Search Report, dated Aug. 26, 2013.
PCT Search Report and Written Opinion, dated Dec. 5, 2013.

*Primary Examiner* — Huan Le
(74) *Attorney, Agent, or Firm* — Dority & Manning, P.A.

(57) ABSTRACT

A method is provided for operating a drive unit for a hybrid vehicle. Through a planetary transmission, an electric motor is coupled to an input shaft of a first sub-transmission and an input shaft of a second sub-transmission shifted in parallel to the first sub-transmission. Through a frictional-locking separating clutch, an internal combustion engine is able to be coupled to the input shaft of the first sub-transmission and, if the separating clutch is locked, is coupled to the same element of the planetary transmission together with the input shaft of the first sub-transmission. For coupling the internal combustion engine at the output coming out of all-electric driving, the torque provided by the internal combustion engine is transferred through the slip-controlled separating clutch in order to unload the previously locked shift element and disengage it in the unloaded state.

6 Claims, 5 Drawing Sheets

(51) Int. Cl.

| | | |
|---|---|---|
| *B60K 6/387* | (2007.10) | |
| *B60K 6/48* | (2007.10) | |
| *B60W 10/02* | (2006.01) | |
| *B60W 10/06* | (2006.01) | |
| *B60W 10/08* | (2006.01) | |
| *B60W 10/113* | (2012.01) | |
| *B60W 20/00* | (2016.01) | |
| *F16H 3/72* | (2006.01) | |
| *B60K 6/442* | (2007.10) | |
| *F16H 3/00* | (2006.01) | |
| *F16H 37/04* | (2006.01) | |

(52) U.S. Cl.
CPC ............... *B60K 6/48* (2013.01); *B60W 10/02* (2013.01); *B60W 10/06* (2013.01); *B60W 10/08* (2013.01); *B60W 10/113* (2013.01); *B60W 20/00* (2013.01); *F16H 3/725* (2013.01); *B60K 2006/4816* (2013.01); *B60W 2710/0644* (2013.01); *B60W 2710/081* (2013.01); *F16H 37/046* (2013.01); *F16H 2003/007* (2013.01); *F16H 2003/008* (2013.01); *F16H 2200/0052* (2013.01); *Y02T 10/6221* (2013.01); *Y02T 10/6256* (2013.01); *Y02T 10/6286* (2013.01); *Y10S 903/91* (2013.01); *Y10S 903/914* (2013.01); *Y10S 903/93* (2013.01)

(58) Field of Classification Search
CPC ..... B60W 2710/0644; B60W 2710/081; F16H 37/046
See application file for complete search history.

(56) References Cited

U.S. PATENT DOCUMENTS

| | | |
|---|---|---|
| 8,251,866 B2 | 8/2012 | Kaltenbach |
| 8,494,739 B2 | 7/2013 | Falkenstein |
| 8,585,522 B2 | 11/2013 | Kaltenbach et al. |
| 8,684,875 B2 | 4/2014 | Kaltenbach et al. |
| 2003/0045389 A1 | 3/2003 | Kima |
| 2010/0125020 A1 | 5/2010 | Ikegami et al. |

* cited by examiner

METHOD FOR OPERATING A DRIVE UNIT FOR A HYBRID VEHICLE

FIELD OF THE INVENTION

The invention relates to a method for operating a drive unit for a hybrid vehicle.

BACKGROUND

A drive unit for a hybrid vehicle is known from DE 10 2006 059 591 A1, whereas the drive unit comprises a drive assembly with an internal combustion engine and an electric motor and a transmission for shifting between the drive assembly and an output. The transmission is designed as a dual-clutch transmission and includes several sub-transmissions. Through a planetary transmission, the electric motor of the drive assembly of the drive unit is coupled to an input shaft of a first sub-transmission and an input shaft of a second sub-transmission shifted in parallel to the first sub-transmission. Through a frictional-locking separating clutch, the internal combustion engine is able to be coupled to the input shaft of the first sub-transmission and, if the separating clutch is locked, is directly coupled to the input shaft of one of the sub-transmissions. For all-electric driving when the internal combustion engine is decoupled, with this drive unit in both sub-transmissions, one gear is engaged, whereas the separating clutch is open.

An additional drive unit for a hybrid vehicle is known from DE 10 2010 061 824 A1, whereas the drive unit of DE 10 2010 061 824 A1 is distinguished from the drive unit of DE 10 2006 059 591 A1 by the fact that a positive-locking bypass shift element is also present, which works together with the planetary transmission in such a manner that, with a locked bypass shift element, there is a torque-proof connection between the electric motor, the input shaft of the first sub-transmission, and the input shaft of the second sub-transmission, while, with an open bypass shift element, this connection between the electric motor and the two input shafts of the two sub-transmissions does not exist. With this drive unit, there can be all-electric driving in three different manners, that is, if, in both sub-transmissions, one gear is engaged and the separating clutch and the bypass shift element are both open, or if the bypass shift element is locked, the separating clutch is open, and in the first or second sub-transmission, one gear is engaged in the other sub-transmission is in neutral.

Both drive units known from DE 10 2006 059 591 A1 and DE 10 2010 061 824 A1 have the disadvantage that, for the coupling of the internal combustion engine coming out of all-electric driving, only one gear is available for the internal combustion engine.

Therefore, the need exists for a method for operating a drive unit for a hybrid vehicle, with which, for the coupling of the internal combustion engine coming out of all-electric driving, several gears are available for the internal combustion engine.

SUMMARY OF THE INVENTION

Based on this, the present invention is subject to a task of creating a new method for operating a drive unit for a hybrid vehicle. Additional objects and advantages of the invention will be set forth in part in the following description, or may be obvious from the description, or may be learned through practice of the invention.

In accordance with the invention, for the coupling of the internal combustion engine to the output when coming out of all-electric driving, the torque provided by the internal combustion engine is transferred through the slip-controlled separating clutch, in order to, during all-electric driving, unload the previously locked shift element and disengage it in the unloaded state. After a subsequent locking of the separating clutch, in the transmission, a power shifting can be carried out at the output without any interruption of the pulling force, in order to engage a gear suitable for the driving speed for the internal combustion engine.

With the assistance of the method in accordance with the invention, upon the coupling of the internal combustion engine at the output coming out of all-electric driving, several gears are available for the internal combustion engine, and this is dependent on the driving speed.

According to an additional form of the invention, for the coupling of the internal combustion engine at the output coming out of all-electric driving, the separating clutch previously open for the all-electric driving is brought into a slip state for the unloading of the shift element to be disengaged, whereas, after the disengagement of the shift element that was previously locked and unloaded with the assistance of the slip-controlled separating clutch, the separating clutch is locked under the reduction of the slip.

Through the torque applied by the internal combustion engine through the slip-controlled separating clutch, a shift element that is locked during all-electric driving can be unloaded and disengaged without any load. In this case, a configuration of a so-called "electrodynamic starting element" arises, whereas a variability of rotational speed then exists among the internal combustion engine, the electric motor and the output shaft of the transmission.

After the locking of the separating clutch, a power shifting can take place, as this is known from DE 10 2010 061 824 A1.

If a gear is engaged in both sub-transmissions during all-electric driving, and if the separating clutch along with the bypass shift element (which is preferably present) are open, the following steps are carried out for the coupling of the internal combustion engine at the output: a) initially, the separating clutch is brought into a slip state, in order to, through the torque transferred by the same into one of the two sub-transmissions, unload a shift element to be disengaged, whereas, at the same time, the torque provided by the electric motor is adjusted in order to keep the torque taking effect at the output constant; b) the unloaded shift element is then disengaged in one of the two sub-transmissions; c) thereupon, the slip at the separating clutch is reduced by lowering the rotational speed of the electric motor, whereas, at the same time, the rotational speed of the internal combustion engine is adjusted; and d) the separating clutch is then locked.

If a gear is engaged in the first sub-transmission during all-electric driving, if the second sub-transmission is in neutral, if the separating clutch is open and the bypass shift element is locked, the following steps are carried out for the coupling of the internal combustion engine at the output: a) initially, the separating clutch is brought into a slip state, in order to, through the torque transferred by the same, unload the bypass shift element, whereas, at the same time, the torque provided by the electric motor is adjusted in order to keep the torque taking effect at the output constant; b) the bypass shift element is then disengaged; c) thereupon, the second sub-transmission is synchronized for a gear suitable for the driving speed with the assistance of the electric motor, and after the synchronization, this gear is engaged in the second sub-transmission; (d) then, the load at the electric motor is reduced and the load at the separating clutch is reduced, while keeping the torque taking effect at the output constant, in such a manner that power no longer flows through the first sub-transmission, whereas the gear of the first sub-transmission is then disengaged; e) thereupon, the slip at the separating clutch is reduced by lowering the rotational speed of the electric motor, whereas, at the same time, the rotational speed of the internal combustion engine is adjusted; and f) the separating clutch is then locked.

If a gear is engaged in the second sub-transmission during all-electric driving, if the first sub-transmission is in neutral, and if the separating clutch is open and the bypass shift element is locked, the following steps are carried out for the coupling of the internal combustion engine at the output: a) initially, the separating clutch is brought into a slip state, in order to, through the torque transferred by the same, unload the bypass shift element, whereas, at the same time, the torque provided by the electric motor is adjusted in order to keep the torque taking effect at the output constant; (b) the bypass shift element is then disengaged; c) thereupon, the first sub-transmission is synchronized for a gear suitable for the driving speed with the assistance of the electric motor, and after the synchronization, this gear is engaged in the first sub-transmission; while, at the same time, the rotational speed of the internal combustion engine is adjusted to the gear suitable for the driving speed; and d) the separating clutch is then locked.

With all three of the aforementioned methods, in every operating situation of the all-electric driving of the internal combustion engine, there can be a coupling even if the gear currently engaged in the transmission should not fit for the coupling of the internal combustion engine.

BRIEF DESCRIPTION OF THE DRAWINGS

Preferred additional forms arise from the following description. Embodiments of the invention are, without any limitation, more specifically described by means of the drawing. Thereby, the following is shown.

DETAILED DESCRIPTION

Reference will now be made to embodiments of the invention, one or more examples of which are shown in the drawings. Each embodiment is provided by way of explanation of the invention, and not as a limitation of the invention. For example features illustrated or described as part of one embodiment can be combined with another embodiment to yield still another embodiment. It is intended that the present invention include these and other modifications and variations to the embodiments described herein.

Figure 1:
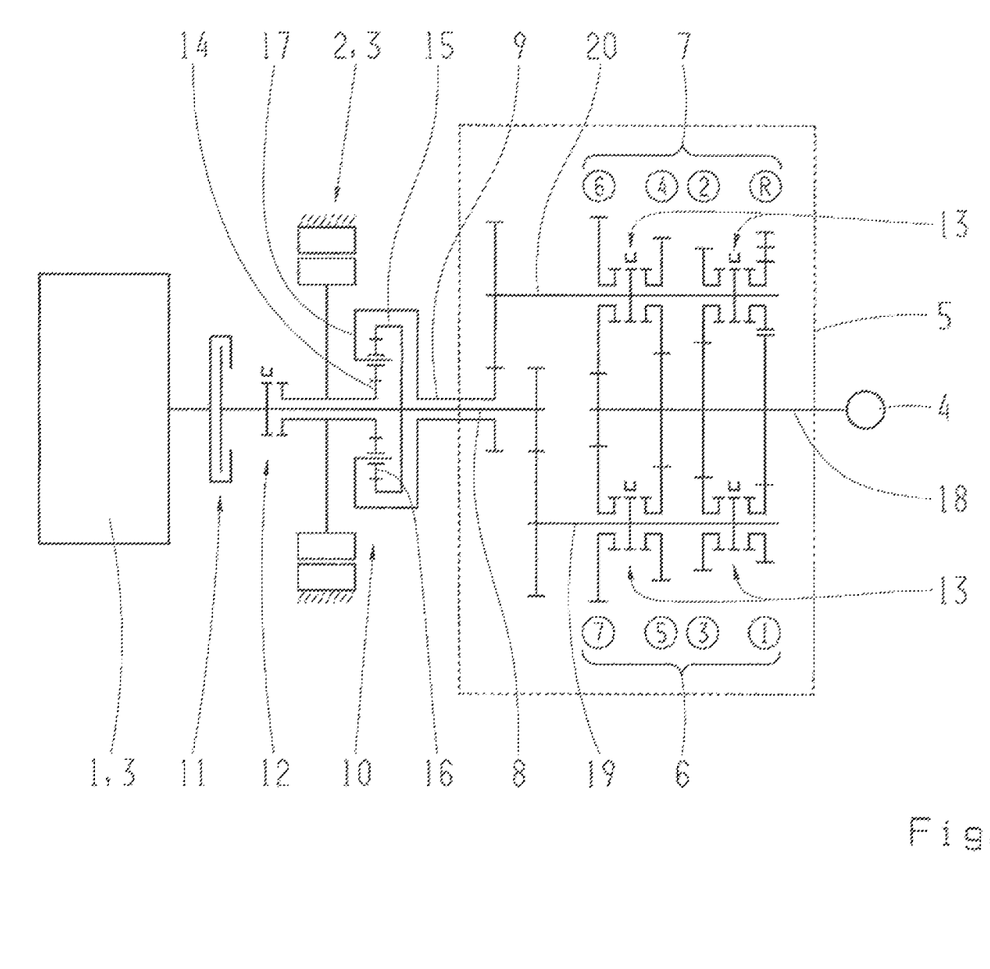
FIG. 1 is a schematic diagram of a first drive unit for a hybrid vehicle to be operated in accordance with the invention.

FIG. 1 shows a schematic diagram of a drive unit for a hybrid vehicle. The drive unit of FIG. 1 includes a drive assembly 3 formed by an internal combustion engine 1 and an electric motor 2, whereas a transmission 5 is shifted between the drive assembly 3 and an output 4. The transmission 5 includes two sub-transmissions 6 and 7, which are shifted, for all intents and purposes, parallel to each other, whereas, in the embodiment shown, the first sub-transmission 6 provides the forward gears "1", "3", "5" and "7", while the second sub-transmission 7 provides the forward gears "2", "4", "6", and the reverse gear "R". The gear set shown in FIG. 1 of the sub-transmission 6 and 7 and the shown distribution of gears on the same is of an exemplary nature.

For providing the forward gears and the reverse gear, the sub-transmissions 6 and 7 of the transmission 5 include positive-locking shift elements 13, which are also designated as gear shifting elements. The structure and the arrangement of the sub-transmissions 6 and 7 are known from dual-clutch transmissions and are familiar to those skilled in the art.

It should only be noted that each sub-transmission 6, 7 includes input shafts 8, 9, which, depending on the shifting state of the shift elements 13, are selectively coupled through an output shaft 18 with the output 4. An input shaft 9 of the sub-transmission 7 is designed as a hollow shaft, in which the other input shaft 8 of the other sub-transmission 6 runs in a coaxial manner. The shift elements 13 of the sub-transmissions 6 and 7 are allocated to lay shafts 19 and 20 of the sub-transmissions 6 and 7.

Through a planetary transmission 10, the electric motor 2 of the drive assembly 3 engages at the input shaft 8 of the first sub-transmission 6 and at the input shaft 9 of the second sub-transmission 7. On the input shaft 8 of the first sub-transmission 6, the internal combustion engine 1 of the drive assembly 3 is able to be directly coupled through a frictional-locking separating clutch 11, whereas, with a locked separating clutch 11, through the planetary transmission 10, the internal combustion engine 1 is further indirectly coupled to the input shaft 9 of the second sub-transmission 7.

Of the planetary transmission 10, a sun gear 14, a ring gear 15, planetary gears 16 and a bar or planetary carrier 17 are shown in FIG. 1. The planetary carrier 17 engages at the input shaft 9 of the second sub-transmission 7. The electric motor 2 of the drive assembly 3 is coupled to the sun gear 14 of the planetary transmission 10. With a locked separating clutch 11, the internal combustion engine 1, as with the input shaft 8 of the first sub-transmission 6, is coupled to the ring gear 15.

The connection of the internal combustion engine 1, the electric motor 2 and the second sub-transmission 7 to the planetary transmission 10 may also differ from the variant shown in FIG. 1. For example, the electric motor 2 may engage at the ring gear 15 and the internal combustion engine 1 with a locked separating clutch 11, just as the input shaft 8 of the first sub-transmission 6 engages at the sun gear 14. With a locked separating clutch 11, the internal combustion engine 1 and the input shaft 8 of the first sub-transmission 6 always engage at the same element of the planetary transmission 10.

A bypass shift element 12 works together with the planetary transmission 10 in such a manner that, with a locked bypass shift element 12, a torque-proof connection between the electric motor 2, the input shaft 9 of the second sub-transmission 7 and the input shaft 8 of the first sub-transmission 6, and thus a mandatory equality of rotational speed between the same, exist, while, with an open bypass shift element 12, this torque-proof connection between the electric motor 2 and the two input shafts 8, 9 of the two sub-transmissions 6, 7, and thus the mandatory equality of rotational speed, do not exist. Under FIG. 1, the bypass shift element 12 comprises a positive-locking shift element.

Figure 2:
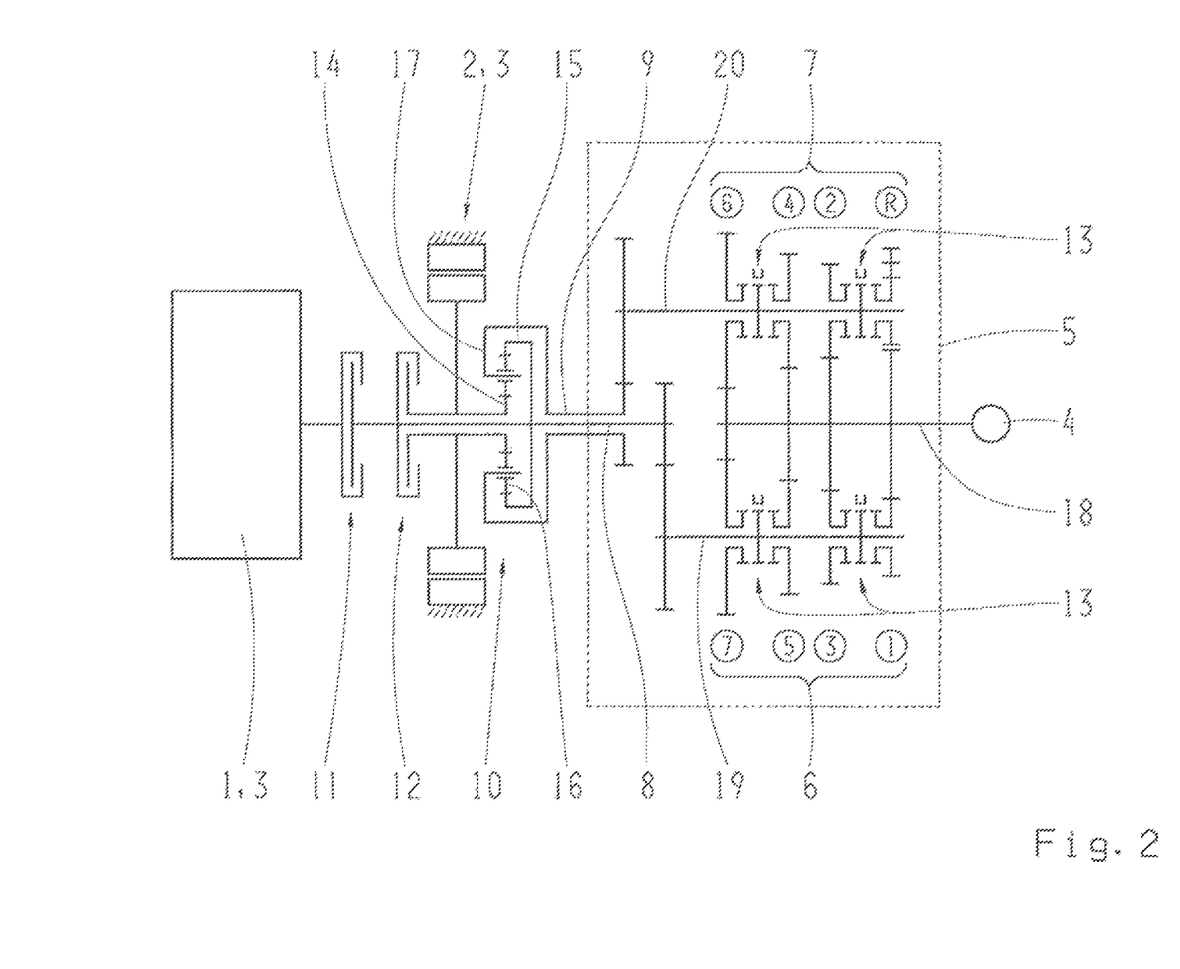
FIG. 2 is a schematic diagram of a second drive unit for a hybrid vehicle to be operated in accordance with the invention.

FIG. 2 shows a variant in which the bypass shift element 12 is designed as a frictional-locking shift element. With respect to all remaining details, FIGS. 1 and 2 match.

With the drive units for a hybrid vehicle shown in FIGS. 1 and 2, there can be all-electric driving in three different manners.

A first operating mode for all-electric driving may take place in such a manner that one gear is engaged in both sub-transmissions 6 and 7, such that both the separating element 11 and the bypass shift element 12 are open. Thereby, it is preferable that, in the first sub-transmission 6, a so-called "long gear," for example the fifth gear is engaged, and, in the second sub-transmission 7, a so-called "short gear," for example the second gear, is engaged, whereas the input shaft 8 of the first sub-transmission 6 then rotates rather slowly, and the input shaft 9 of the second sub-transmission 7 then rotates rather quickly. For the electric motor 2, this results in a high overall transmission ratio through the planetary transmission 10, by which a high starting torque is possible with all-electric driving. In addition, the use of a relatively long gear in the first sub-transmission has the advantage that, with the coupling of the internal combustion engine through the separating clutch, little repercussion can be felt at the output 4; for this operating mode, the bypass shift element 12 is optional.

Furthermore, with the drive units of FIGS. 1 and 2, there can be all-electric driving in other operating modes if the planetary transmission 10 is bypassed with a locked bypass shift element 12. Thus, it is possible that, with a locked bypass shift element 12, one gear is engaged either in the first sub-transmission 6 or in the second sub-transmission 7, whereas, for all-electric driving with an open separating clutch 11, no gear is engaged in the other sub-transmission, such that the other transmission is then in neutral.

In order to couple the internal combustion engine 1 to the output 4 when coming out of all-electric driving, the torque provided by the internal combustion engine 1 is transferred with a slip-controlled separating clutch 11 and serves the purpose of unloading a previously locked shifting element for electric driving and disengaging it in the unloaded state.

For the drive unit, the configuration of an electrodynamic starting element arises, whereas a variability of rotational speed then exists among the rotational speeds of the internal combustion engine 1, the electric motor 2 and the output shaft 18 of the transmission 5. Through the subsequent adjustment to the rotational speed at the electric motor 2, the slip at the separating clutch 11 can then be once again reduced, in order to minimize the thermal load at the separating clutch 11. As soon as the separating clutch 11 once again adheres and is accordingly locked without any slip, as known from the state of the art, a power shifting can be carried out in order to engage a gear suitable for the driving speed for the internal combustion engine 1. For the invention, it is therefore essential that, with an initially open separating clutch 11, for the coupling of the internal combustion engine 1 during all-electric driving, the separating clutch 11 is initially operated in slip and thus transfers the torque provided by the internal combustion engine 1, in order to unload a shift element that was locked during all-electric driving, and disengage it in the load-free state. Subsequently, the slip at the separating clutch 11 is once again reduced.

Figure 3:
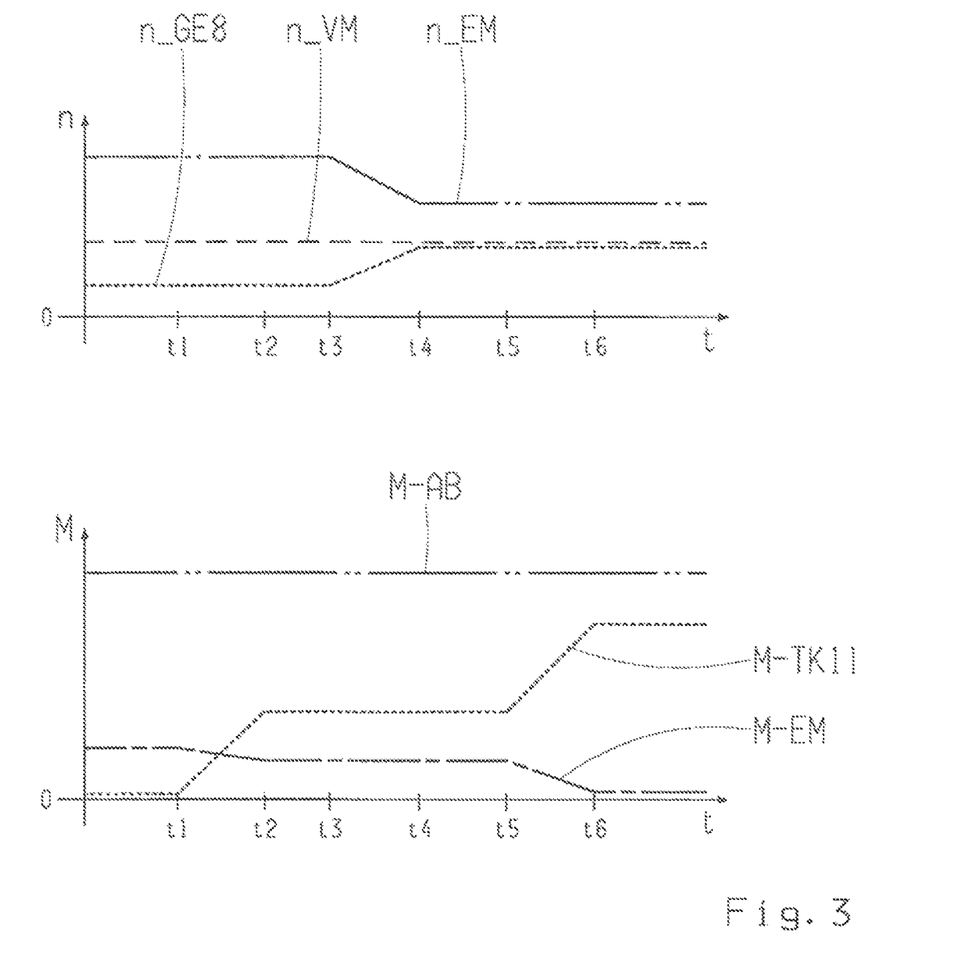
FIG. 3 is a diagram for the illustration of a first method in accordance with the invention for operating the drive unit in accordance with FIG. 1 or 2.
Figure 4:
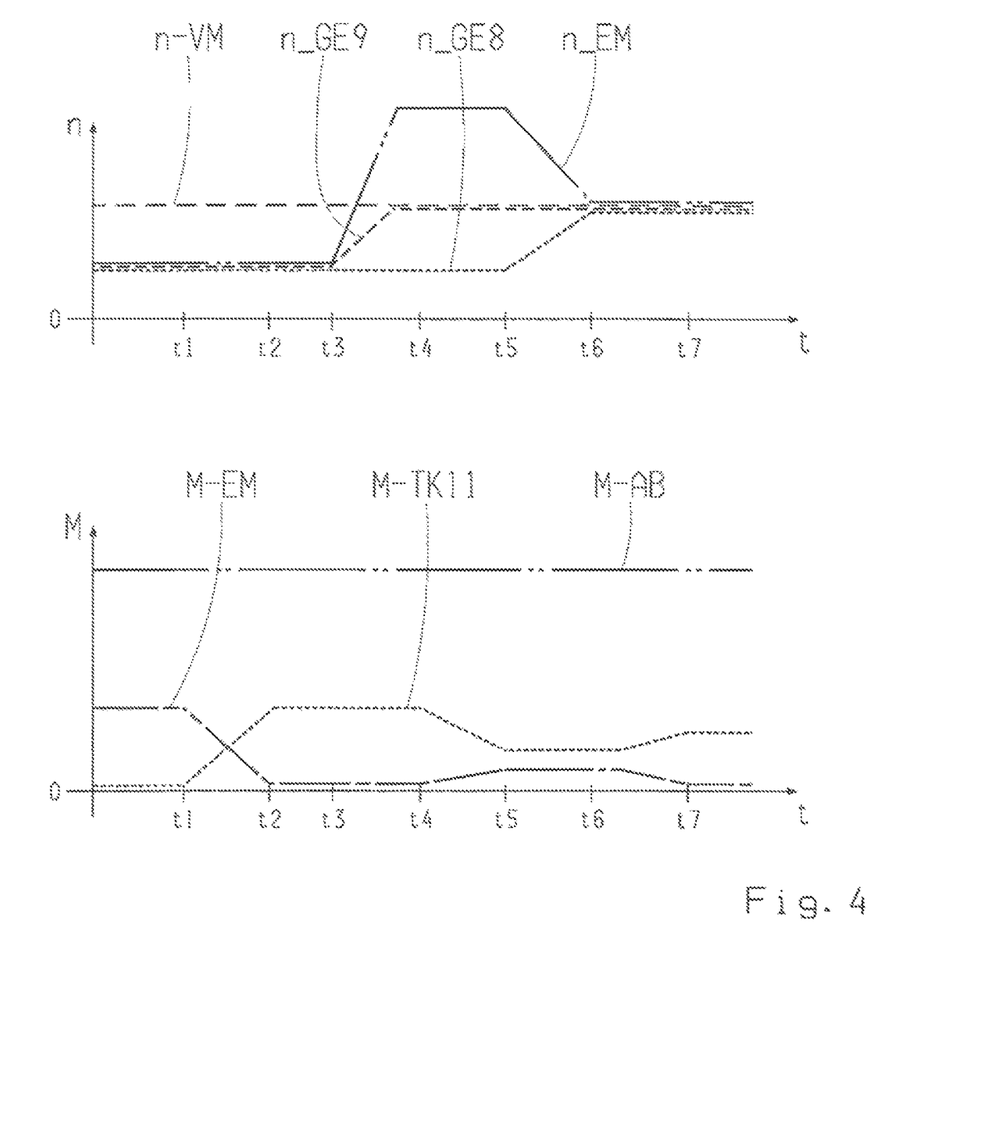
FIG. 4 is a diagram for the illustration of a second method in accordance with the invention for operating the drive unit in accordance with FIG. 1 or 2.
Figure 5:
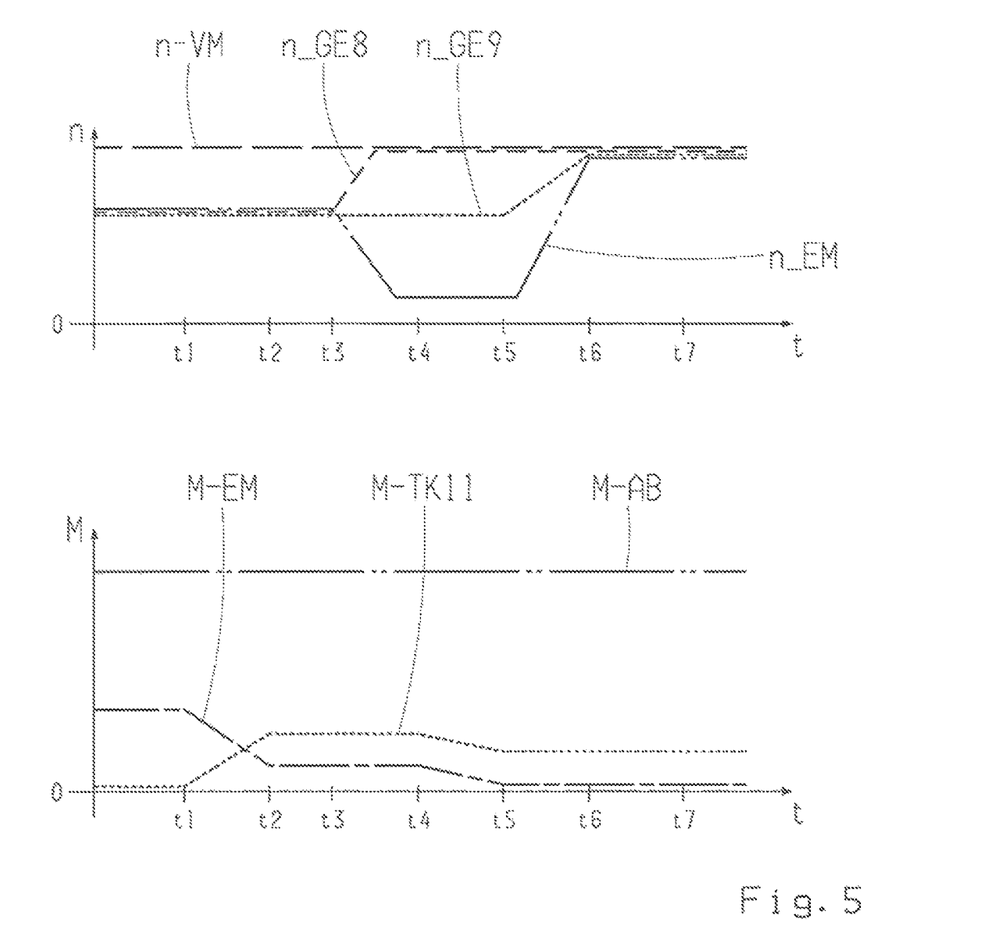
FIG. 5 is a diagram for the illustration of a third method in accordance with the invention for operating the drive unit in accordance with FIG. 1 or 2.

In the following, with reference to FIGS. 3 to 5, the methods for coupling the internal combustion engine 1 at the output 4 for the three different driving situations of all-electric driving are described in detail. FIGS. 3 to 5 show different curves of rotational speeds n and torques M, that is, a chronological rotational speed curve n-EM of the electric motor 2, a chronological rotational speed curve n-VM of the internal combustion engine 1, a chronological rotational speed curve n-GE8 of the input shaft 8 of the first sub-transmission 6, a chronological rotational speed curve n-GE9 of the input shaft 9 of the second sub-transmission 7, a chronological torque curve M-AB of the torque taking effect at the output 4, a chronological torque curve M-EM of the torque provided by the electric motor 2 and a chronological torque curve M-TK11 of the torque transferred by the separating clutch 11.

FIG. 3 thereby relates to the driving situation of electric driving in which one gear is engaged both in the first sub-transmission 6 and in the second sub-transmission 7, and whereas the separating clutch 11 and the bypass shift element 12 are both open.

For the method described below for this driving situation of electric driving, the bypass shift element 12 is optional, which means that the bypass shift element 12 may also be omitted for this method.

In the initial state, that is in FIG. 3 prior to the point in time t1, there is all-electric driving. For this purpose, one gear is engaged in each of the sub-transmissions 6 and 7, preferably a long gear in the first sub-transmission 6 and a short gear in the second sub-transmission 7. The separating clutch 11 is open and the bypass shift element 12 is likewise open. The internal combustion engine 1 has a rotational speed n-VM, which is greater than zero, from which it follows that the internal combustion engine 1 is already running and therefore was already started. For all-electric driving, the electric motor 2 rotates with the rotational speed n-EM, whereas the electric motor 2 provides the torque M-EM. The torque M-AB is applied at the output 4. In accordance with FIG. 3, prior to the point in time t1, the rotational speed n-GE8 of the input shaft 8 of the first sub-transmission 6 is too low, such that the internal combustion engine 1 cannot be directly coupled.

Coming out of such driving situation of all-electric driving, in order to then couple the internal combustion engine 1 to the output 4, the frictional-locking separating clutch 11 is initially brought into a slip state between the points in time t1 and t2, by increasing the torque transferred by the separating clutch 11, in order to, through the torque transferred by the separating clutch 11 in one of the two sub-transmissions 6 and 7, unload a shift element 13 to be disengaged. Thereby, the torque M-EM provided at the same time by the electric motor 2 is adjusted (i.e., reduced) in order to keep the torque M-AB taking effect at the output constant. Between the points in time t1 and t2, it is preferable that the power flow is reduced through the first sub-transmission 6 and the first sub-transmission 6 is thus made load-free, such that, subsequently between the points in time t2 and t3, in the first sub-transmission 6, the previously engaged gear can be disengaged without any load. Thereupon, between the points in time t3 and t4, the slip at the separating clutch 11 is reduced, that is, by lowering the rotational speed n-EM of the electric motor. At the same time, an adjustment to the rotational speed n-VM takes place at a gear suitable for the driving speed, whereas, in FIG. 3, the rotational speed n-VM of the internal combustion engine 1 is already suitable. The separating clutch 11 is subsequently locked.

Starting with the point in time t4, the configuration of an electrodynamic starting element is present for the drive unit, such that, starting with the point in time t4, a power shifting known from the state of the art may accordingly take place. For this purpose, a new gear suitable for the internal combustion engine 1 is engaged, whereas synchronous conditions for the gear to be engaged then exist, in particular, if the separating clutch 11 comes into adhesion. This engagement of the new gear for the internal combustion engine 1 takes place between the points in time t4 and t5, whereas, alternatively, the bypass shift element 12 can also be synchronized and locked if the bypass shift element 12 is present, and if the gear currently engaged in the second sub-transmission 7 is better suited for the internal combustion engine 1. Subsequently, if applicable, a transfer of load by the internal combustion engine 1 takes place between the points in time t5 and t6, whereas the torque M-EM provided by the electric motor 2 is reduced to zero or an arbitrary value depending on the specification of the hybrid operating strategy.

FIG. 4 relates to a design variant of the method in accordance with the invention, in which, prior to the point in time t1, there is all-electric driving such that one gear is engaged in the first sub-transmission 6, for example the fifth gear, that the second sub-transmission 7 is in neutral, the separating clutch 11 is open and the bypass shift element 12 that now must be present is locked. In FIG. 4, it is assumed that the torque required by the driver remains unchanged. Prior to the point in time t1, the internal combustion engine 1 is already started, with the result that the rotational speed n-VM is greater than zero and above the rotational speed n-GE8 and the rotational speed n-GE9 of the two sub-transmissions 6 and 7. Therefore, the internal combustion engine 1 cannot be directly coupled to the output 4. Coming out of such driving situation of all-electric driving, in order to then couple the internal combustion engine 1 to the output 4, the friction coupling 11 is initially brought into a slip state between the points in time t1 and t2, by increasing the torque M-TK11 transferred by the same, such that the torque that the internal combustion engine 1 provides can be transferred from the separating clutch 11. Thereby, the torque M-EM provided by the electric motor 2 is reduced at the same time, such that the output torque M-AB remains constant. If the electric motor 2 is then free of torque, the bypass shift element 12 is also free of torque.

Between the points in time t2 and t3, the torque-free bypass shift element 12 can then be opened without any load.

Subsequently, a synchronization of the second sub-transmission 7 for a gear suitable for the driving speed takes place between the points in time t3 and t4, with the assistance of the electric motor 2, that is, by increasing the rotational speed n-EM of the electric motor. After a synchronization has taken place, between the points in time t3 and t4, this gear (for example, the second gear) is also engaged in the second sub-transmission 7.

Subsequently, between the points in time t4 and t4, a load increase takes place at the electric motor 2 by increasing the torque M-EM provided by the same, and a load reduction takes place at the separating clutch 11 by reducing the torque M-TK11, whereas the output torque M-AB thereby remains constant. Power then no longer flows through the gear of the first sub-transmission 6, whereas this is the case if the torques of the electric motor 2 and the internal combustion engine 1 are adjusted in a manner corresponding to the stationary transmission ratio of the planetary transmission 10.

As soon as first sub-transmission 6 is load-free, the gear in the first sub-transmission 6 is disengaged between the points in time t4 and t5.

Thereby, between the points in time t5 and t6, the slip at the separating clutch 11 is reduced, that is, by lowering the rotational speed n-EM of the electric motor 2. An adjustment n-VM to the rotational speed of the combustion engine 1 takes place at the same time, whereas, in the embodiment shown in FIG. 4, the rotational speed n-VM of the internal combustion engine 1 is already suitable for the gear engaged in the second sub-transmission 7.

Subsequently, the locking of the separating clutch 11 takes place between the points in time t5 and t6.

Starting with the point in time t6, the configuration of an electrodynamic starting element is in turn present for the drive unit, such that, as known from the state of the art, a power shifting can take place.

Between the points in time t6 and t7, the bypass shift element 12 is locked; if applicable, there is a load transfer by the internal combustion engine 1 through the adhering separating clutch 11, and a reduction of the torque M-EM provided by the electric motor 2 to zero or to a value preset by the hybrid operating strategy. As an alternative to the locking of the bypass shift element 12, a new gear can be synchronized and engaged between the points in time t6 and t7, even in the first sub-transmission 6.

FIG. 5 illustrates a variant of the method in accordance with the invention for the case in which there is all-electric driving by the fact that one gear is engaged in the second sub-transmission 7, for example the sixth gear, that the first sub-transmission 6 is in neutral, that the bypass shift element 12 is locked and the separating clutch 11 is open. Furthermore, in accordance with FIG. 5, in the initial state of all-electric driving prior to the point in time t1, the internal combustion engine 1 is already started, such that its rotational speed n-VM is accordingly greater than zero and greater than the rotational speeds n-GE8 and n-GE9 of the two input shafts 8 and 9 of the two sub-transmissions 6 and 7. Accordingly, at the point in time t1, the internal combustion engine 1 cannot be directly coupled to the output 4.

Coming out of this all-electric driving, in order to then couple the internal combustion engine 1 to the output 4, the separating clutch is initially brought into a slip state between the points in time t1 and t2 by increasing the torque m-TK11 transferable by the separating clutch, such that the torque made available by the internal combustion engine 1 is transferred to the same, whereas, at the same time, the torque M-EM of the electric motor 2 is reduced, in order to keep the output torque M-AB constant.

The torques of the electric motor 2 and internal combustion engine 1 are adjusted in a manner corresponding to the stationary transmission ratio of the planetary transmission 10, such that the bypass shift element 12 is then load-free.

Subsequently, the bypass shift element 12 is disengaged without any load between the points in time t2 and t3.

Thereupon, between the points in time t3 and t4, a synchronization of the first sub-transmission 6 to a gear suitable for the driving speed takes place, that is through a change to the rotational speed n-EM of the electric motor 2. After synchronization has taken place, this gear is engaged in the first sub-transmission 6. At the same time, an adjustment to the rotational speed n-VM of the electric motor 1 takes place in this gear, whereas, in FIG. 5, the rotational speed n-VM of the internal combustion engine is already suitable for this gear. In addition, the separating clutch 11 is locked between the points in time t3 and t4.

At the point in time t4, the configuration of an electrodynamic starting element is in turn present for the drive unit, such that, in the manner known from the state of the art, a power shifting may be carried out while maintaining the drive torque at the output 4, in particular upon a load transfer by the internal combustion engine 1 and upon a load reduction at the electric motor 2. Such a power shifting is carried out between the points in time t4 and t5.

Between the points in time t5 and t6, the gear in the second sub-transmission 7 is then disengaged, and, by adjusting the rotational speed n-EM at the electric motor 1, the planetary transmission 10 is brought into direct drive. If, at the point in time t6, the planetary transmission 10 is in direct drive, the bypass shift element 12 can be locked between the points in time t6 and t7. Both the internal combustion engine 1 and the electric motor 2 are then coupled to the output with a suitable gear.

In the diagrams of FIGS. 3 to 5, torques that are required for changes to the rotational speed based on inertial masses were omitted for reasons of simplicity.

Accordingly, the invention enables a coupling of the internal combustion engine 1 coming out of all-electric driving, whereas a gear for the internal combustion engine 1 that is suitable for the driving speed can be engaged without any interruption of the pulling force.

Modifications and variations can be made to the embodiments illustrated or described herein without departing from the scope and spirit of the invention as set forth in the appended claims.

REFERENCE SIGNS

1 Internal combustion engine
2 Electric motor
3 Drive assembly
4 Output
5 Transmission
6 Sub-transmission
7 Sub-transmission
8 Input shaft
9 Input shaft
10 Planetary transmission
11 Separating clutch
12 Bypass shift element
13 Shift element
14 Sun gear
15 Ring gear
16 Planetary gear
17 Planetary carrier
18 Output shaft
19 Lay shaft
20 Lay shaft
n Rotational speed
M Torque
t Time
n-EM Rotational speed curve of electric motor
n-VM Rotational speed curve of internal combustion engine
n-GE8 Rotational speed curve of input shaft 8
n-GE9 Rotational speed curve of input shaft 9
M-AB Torque curve of output
M-EM Torque curve of electric motor
M-TK11 Torque curve of separating clutch 11
t1/t7 Point in time

The invention claimed is:

1. A method for operating a drive unit for a hybrid vehicle, wherein the drive unit includes:
   a drive assembly with an internal combustion engine and an electric motor;
   a transmission with at least a first sub-transmission and a second sub-transmission in parallel between the drive assembly and an output;
   through a planetary transmission arrangement, the electric motor is coupled to an input shaft of the first sub-transmission and an input shaft of the second sub-transmission
   through a frictional-locking separating clutch, the internal combustion engine couples to the input shaft of the first sub-transmission and, when the separating clutch is locked, is coupled to a same element of the planetary transmission as the input shaft of the first sub-transmission;
   wherein the method comprises coupling the internal combustion engine to the output when coming out of all-electric driving by transferring torque provided by the internal combustion engine through the separating clutch in a slip-controlled manner in order to unload a shift element previously locked for the all-electric driving and disengage the shift element in an unloaded state; and
   wherein the drive unit includes a positive-locking or frictional-locking bypass shift element that works together with the planetary transmission arrangement in such a manner that, with the bypass shift element locked, a torque-proof connection exists between the electric motor and the two input shafts of the two sub-transmissions, such that an equality of rotational speeds exists between the two input shafts and, with the bypass shift element open, the torque-proof connection between the electric motor and the two input shafts of the two sub-transmissions with the equality of rotational speed does not exist.

2. The method according to claim 1, wherein the after disengagement of the shift element with the assistance of the slip-controlled separating clutch, the separating clutch is locked under a reduction of the slip.

3. The method according to claim 2, wherein after locking of the separating clutch, a power shifting is carried out in the transmission to the output without interruption of pulling force by engaging a gear suitable for existing driving speed for the internal combustion engine.

4. The method according to claim 1, wherein a gear is engaged in both sub-transmissions during the all-electric driving and the separating clutch is open, the method comprising the following steps for coupling the internal combustion engine to the output:
   a) initially, the separating clutch is brought into the slip state, in order to, through the torque transferred by the separating clutch into one of the two sub-transmissions, unload the shift element to be disengaged, whereas, concurrently, the torque provided by the electric motor is adjusted in order to keep torque taking effect at the output constant;
   b) the unloaded shift element is then disengaged in one of the two sub-transmissions;
   c) thereupon, the slip at the separating clutch is reduced by lowering the rotational speed of the electric motor, whereas, concurrently, the rotational speed of the internal combustion engine is adjusted; and
   d) the separating clutch is then locked.

5. The method according to claim 1, wherein a gear is engaged in the first sub-transmission during the all-electric driving, the second sub-transmission is in neutral, and the separating clutch is open, the method comprising the following steps for coupling the internal combustion engine to the output:
- a) initially, the separating clutch is brought into the slip state, in order to, through torque transferred by the separating clutch, unload the bypass shift element, whereas, concurrently, torque provided by the electric motor is adjusted in order to keep torque taking effect at the output constant;
- b) the bypass shift element is then disengaged;
- c) thereupon, the second sub-transmission is synchronized for a gear suitable for existing driving speed with assistance of the electric motor, and after the synchronization, the gear is engaged in the second sub-transmission;
- d) then, the load at the electric motor is reduced and the load at the separating clutch is reduced, while keeping the torque taking effect at the output constant, in such a manner that power no longer flows through the first sub-transmission, whereas the gear of the first sub-transmission is then disengaged;
- e) thereupon, the slip at the separating clutch is reduced by lowering the rotational speed of the electric motor, whereas, concurrently, the rotational speed of the internal combustion engine is adjusted; and
- f) the separating clutch is then locked.

6. The method according to claim 1, wherein a gear is engaged in the second sub-transmission during the all-electric driving, the first sub-transmission is in neutral, the separating clutch is open, and the bypass shift element is locked, the method comprising the following steps for coupling the internal combustion engine to the output:
- a) initially, the separating clutch is brought into the slip state, in order to, through the torque transferred by the separating clutch, unload the bypass shift element, whereas, concurrently, torque provided by the electric motor is adjusted in order to keep torque taking effect at the output constant;
- b) the bypass shift element is then disengaged;
- c) thereupon, the first sub-transmission is synchronized for a gear suitable for existing driving speed with assistance of the electric motor, and after the synchronization, the gear is engaged in the first sub-transmission while, concurrently, rotational speed of the internal combustion engine is adjusted to the gear suitable for the driving speed; and
- d) the separating clutch is then locked.

* * * * *